United States Patent [19]

Joy et al.

[11] 4,380,491
[45] Apr. 19, 1983

[54] SPRAY NOZZLE ASSEMBLY FOR SPRAY DRYER

[75] Inventors: Ira L. Joy, Alabaster; Neal B. Humphreys, Odenville, both of Ala.

[73] Assignee: Combustion Engineering, Inc., Windsor, Conn.

[21] Appl. No.: 296,384

[22] Filed: Aug. 26, 1981

[51] Int. Cl.³ .............................................. B01D 1/16
[52] U.S. Cl. .................................. 159/4 B; 159/4 R; 261/89
[58] Field of Search .................. 159/4 B, 4 R; 261/88, 261/89

[56] References Cited

U.S. PATENT DOCUMENTS

| | | | |
|---|---|---|---|
| 1,971,566 | 8/1934 | Hutton | 159/4 B |
| 2,077,819 | 4/1937 | Zizinia | 159/4 B |
| 4,226,603 | 10/1980 | Larsson et al. | 159/4 B |

Primary Examiner—Norman Yudkoff
Attorney, Agent, or Firm—William W. Habelt

[57] ABSTRACT

In a spray dryer apparatus (20) wherein a slurry (30) is contacted with a hot drying gas (12), a spray head assembly comprising an annular swirler vane assembly (42) disposed about the gas inlet in the roof of the spray dryer (20), an atomizing spray head housing (44) disposed coaxially within the center of the swirler vane assembly, an elongated guide tube (46) extending upwardly from the spray head housing (44), an atomizing spray head (58) disposed in the spray head housing with its spray tip (60) extending into the spray dryer (20), an elongated seal sleeve (72) extending downwardly from the guide tube into the spray head housing, and a support tube (70) extending upwardly from the spray head (58) into the seal sleeve (72). The support tube (70) is slidably translatable with the seal sleeve (70) and the guide tube (46) so that the spray head (58) attached to the support tube may be withdrawn upwardly through the guide tube for removal for inspection and maintenance. First seal means (74) are provided between the support tube and the seal sleeve to give a gas tight seal between the interior of the guide tube and the interior of the spray head housing. Second seal means (76) are provided at the lower end of the spray head to give a gas tight seal between the interior of the spray head housing and the spray drying chamber. The interior of the guide tube is pressurized to effectuate the seals and hold the spray head in position during operation.

5 Claims, 3 Drawing Figures

SPRAY NOZZLE ASSEMBLY FOR SPRAY DRYER

BACKGROUND OF THE INVENTION

The present invention relates in general to spray dryers, and more particularly, to a spray nozzle assembly for injecting a slurry of finely divided material into the spray drying chamber to be contacted with a hot drying gas therein.

Spray drying is well-known in the prior art and has been used for drying solutions or slurries of finely divided particulate material dissolved or suspended in a volatile carrier liquid, most commonly water. The slurry or solution to be processed is atomized and sprayed into a hot gas stream passing through the spray dryer. The volatile carrier liquid is evaporated, and the dissolved or suspended particulate material dried to a fine powder. Spray drying has for many years been used for drying and processing food products, pharmaceuticals, and many other powder products.

More recently, spray drying has been found to be an effective method for treating flue gases from fossil fuel-fired furnaces to remove gaseous pollutants, most commonly sulfur dioxide, therefrom. In such an application, a solution or slurry of sulfur oxide absorbent, such as lime, limestone, soda ash, or caustic soda, in water is atomized and sprayed into the spray drying chamber to contact hot flue gas from the furnace. As the water in the slurry or solution is evaporated by heat from the hot flue gas, the sulfur oxide absorbent reactant contained therein reacts with sulfur dioxides contained in the flue gas. The resultant product is a dry powder of sulfur-containing salt.

A typical spray dryer generally comprises a housing defining a spray drying chamber designed to provide the proper environment and residence time for efficient drying of the solution or slurry. The drying gas is typically introduced to the vessel through an inlet at the top thereof and an outlet near the bottom thereof. The solution or slurry of particulate material to be dried is introduced into the vessel in a finely divided form through atomization means such as a spray nozzle or a disc-type atomizer. The atomized solution or slurry is sprayed into the hot drying gas as it enters the spray drying chamber so as to intermix with the hot gas so that the volatile carrier liquid is evaporated and the dissolved or suspended particulate material reduced to a fine, dry powder.

Experience has shown that it is desirable to have ready access to the atomization means to facilitate replacement and/or maintenance thereof. Slurry spray nozzles are subject to plugging by the particulate material suspended in the slurry and, therefore, must be accessible for cleaning. As disc-type atomizers are subject to severe abrasion as a result of the wearing action of the particulate material in the slurry against the surface of the atomizing wheel, they also must be accessible for inspection and maintenance. Additionally, it is desirable to have ready access to the atomization means so that the atomization means, whether it is a spray nozzle or a disc-type atomizer, may be changed in order to vary the particle size of the atomized solution or slurry as a means of controlling the characteristics of the resultant powdered product.

It is, therefore, an object of the present invention to provide an improved spray nozzle assembly wherein the atomizing spray means, whether a spray nozzle or a disc-type atomizer, may be readily removed for inspection and maintenance.

SUMMARY OF THE INVENTION

According to the present invention, there is provided a spray nozzle assembly for use in a spray drying apparatus, particularly for use in spraying a slurry of sulfur oxide absorbent particulate material into a hot furnace flue gas for removing the sulfur oxides contained in the flue gas as a dry sulfur-containing salt, wherein the atomizing spray means, whether a spray nozzle or a spinning atomizer wheel, may be withdrawn from the spray nozzle assembly without removing the remainder of the spray nozzle assembly from the spray drying apparatus.

The spray nozzle assembly of the present invention comprises, inter alia, an annular swirler vane assembly disposed about a gas inlet in the roof of the spray drying apparatus housing and defining an annular flow passageway through which the drying gas passes from a drying gas supply duct into the spray drying apparatus, an atomizing spray head housing disposed coaxial within the center of the annular swirler vane assembly, an elongated guide tube mated with the atomizing spray head housing and extending upwardly through the drying gas supply duct to terminate externally of the gas supply duct, an atomizing spray head disposed at a central opening in the floor of the atomizing spray head housing with a spray tip extending into the spray drying apparatus, and a support tube extending upwardly from the atomizing spray head and being slidably translatable within the guide tube so as to permit the support tube and the atomizing spray head attached thereto to be withdrawn upwardly through the guide tube and the drying gas supply duct to a location exterior thereof for inspection and maintenance.

The annular swirler vane assembly is disposed about the gas inlet in the roof of the spray dryer housing intermediate the outlet of the gas supply duct and the spray dryer housing. A plurality of swirler vanes are disposed within the annular flow passage defined by the swirler vane assembly for imparting a rotational movement to the drying gas passing therethrough. The atomizing spray head housing is disposed coaxially within the center of the annular swirler vane assembly with the atomizing spray head being disposed at a central opening in the floor of the spray head housing with its spray tip extending through the central opening into the spray drying chamber so that the slurry spray may be contacted with the hot rotating gas as it passes through the swirler vane assembly into the spray drying chamber.

The atomizing spray head housing has a conical, inwardly-flared flange at its upper end. The elongated guide tube has a conical, outwardly-flared flange at its lower end adapted to mate with the conical, inwardly-flared flange at the upper end of the spray head housing. The tubular portion of the elongated guide tube extends upwardly through the drying gas supply duct to terminate in a capped upper end disposed externally of the gas drying supply duct.

An elongated seal sleeve is mounted to the guide tube at a point near where the lower end of the guide tube flares outwardly and extends downward therefrom to form an extension of the tubular portion of the guide tube into the interior space of the outwardly-flared flange of the guide tube. The support tube extends upwardly from the atomizing spray head into the seal sleeve and is slidably translatable within the seal sleeve and the guide tube.

To provide a gas tight seal between the seal sleeve and the support tube, an upper seal plate is mounted to the top of the support tube with first seal means mounted about the circumference of the upper seal plate and extending radially outward to contact the inner wall of the seal sleeve. Additionally, an annular lower seal plate is mounted about the lower end of the atomizing spray head with second seal means disposed between the lower seal plate and the floor of the spray head housing for providing a gas tight seal between the spray head housing and the lower seal plate.

To effect these gas tight seals, a pressurized gas is controllably supplied into the interior of the guide tube at a location intermediate its capped upper end and the upper seal plate. The pressurized gas forces the first seal means mounted about the circumference of the upper seal plate to seal against the side of the seal sleeve thereby holding the pressure level within the interior of the guide tube. Because of the differential between the pressure in the interior of the guide tube and the lower pressure within the spray drying chamber, a pressure force is established against the upper seal plate which is transmitted through the support tube to the lower seal plate mounted about the spray head thereby driving the lower seal plate downwardly against the second seal means disposed between the lower seal plate and the floor of the spray head housing so as to provide a gas tight seal therebetween and prevent the hot flue gas from entering the spray nozzle assembly.

DETAILED DESCRIPTION OF A PREFERRED EMBODIMENT

While the specification concludes with claims particularly pointing out and distinctly claiming a spray nozzle assembly which may be utilized in any spray dryer apparatus where a slurry or solution is to be contacted with a hot drying gas in order to dry the liquid carrier and reduce the dissolver slurried solids to a fine dry powder, it is believed that the invention can be best described and better understood from the following description of a preferred embodiment of the present invention in conjunction with a spray dryer apparatus being utilized as an absorption chamber employed in removing sulfur oxides from hot flue gases generated in a fossil fuel-fired furnace. It is to be understood, however, that the spray nozzle assembly of the present invention can also be used in many other spray drying applications well-known in the prior art.

Figure 1:
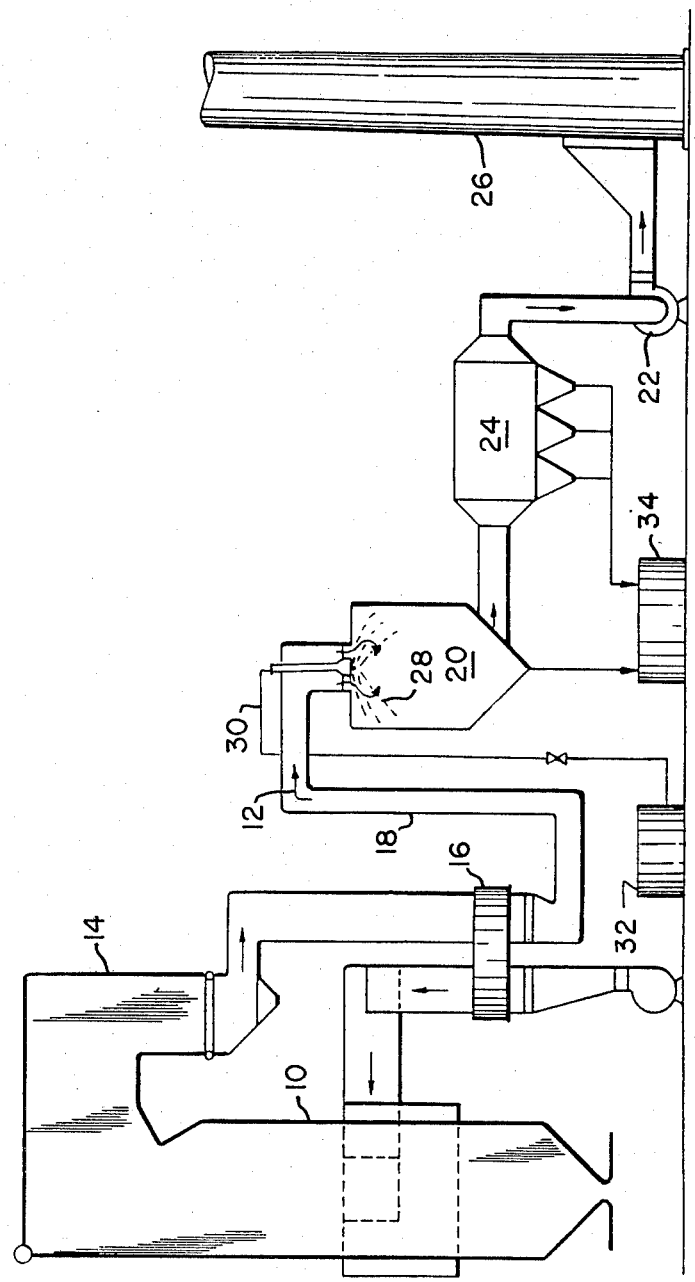
FIG. 1 is a schematic flow diagram illustrating a spray dryer apparatus embodying the spray nozzle assembly of the present invention, the spray drying apparatus being employed as an absorption chamber for removing sulfur oxides from hot flue gases as a dry sulfur-bearing salt.

Referring now to the drawings and to FIG. 1 in particular, therein is depicted a schematic flow diagram illustrating a spray drying apparatus employed as an absorption chamber for removing sulfur oxides from hot flue gas generated in a fossil fuel-fired furnace. A sulfur-bearing fossil fuel, such as oil or coal, is combusted with air in furnace 10 to form combustion products termed flue gas 12. The flue gas, including sulfur oxide gases generated during the combustion of the sulfur-bearing fuel within the furnace 10, exits from the furnace through convection bank 14. The hot flue gas traversing convection bank 14 passes over various heat exchange surfaces immersed therein in heat exchange relationship with a liquid such as water flowing through the heat exchange surface to generate steam. The flue gas leaving convection bank 14 is then typically passed through an air heater 16 to preheat the combustion air being supplied to the furnace 10. As the flue gas passes through air heater 16, being in indirect heat exchange relationship with the combustion air being conveyed to the furnace, the flue gas is cooled to a temperature typically in the range of 100 to 200 C.

From the air heater, the flue gas 12 passes through duct 18 to one or more spray dryer absorption chambers 20. Having traversed the spray dryer absorption chambers 20, the flue gas is drawn by induced draft fan 22 through a dry particulate collector 24 and thence to a stack 26 for venting to the atmosphere.

As the hot flue gas 12 passes through the spray dryer absorption chamber 20, it contacts an atomized spray 28 of sulfur oxide absorbent slurry 30 supplied from slurry prep tank 32. The slurry 30 is prepared in slurry prep tank 32 by mixing a sulfur oxide absorbent such as lime, calcium hydroxide, soda ash, or caustic soda with a volatile carrier liquid, most commonly water. The sulfur oxide absorbent within the slurry reacts with the sulfur oxides contained in the flue gas as it passes through spray dryer 20 forming sulfur-containing salts. At the same time, the water in the slurry is evaporated by the sensible heat content of the hot flue gas whereby the sulfur-containing salts are reduced to a fine powder so that only dry particulates remain within the flue gas. While much of the dry particulate precipitates from the flue gas in the hopper of the spray dryer 20, the remainder of the dry particulate is removed from the flue gas as it passes through the dry paticulate collector 24 disposed downstream of the spray dryer 20. The dry sulfur-containing particulate from the spray dryer 20 in the dry particulate collector 24 is passed to collection tank 34 for subsequent disposal.

Figure 2:
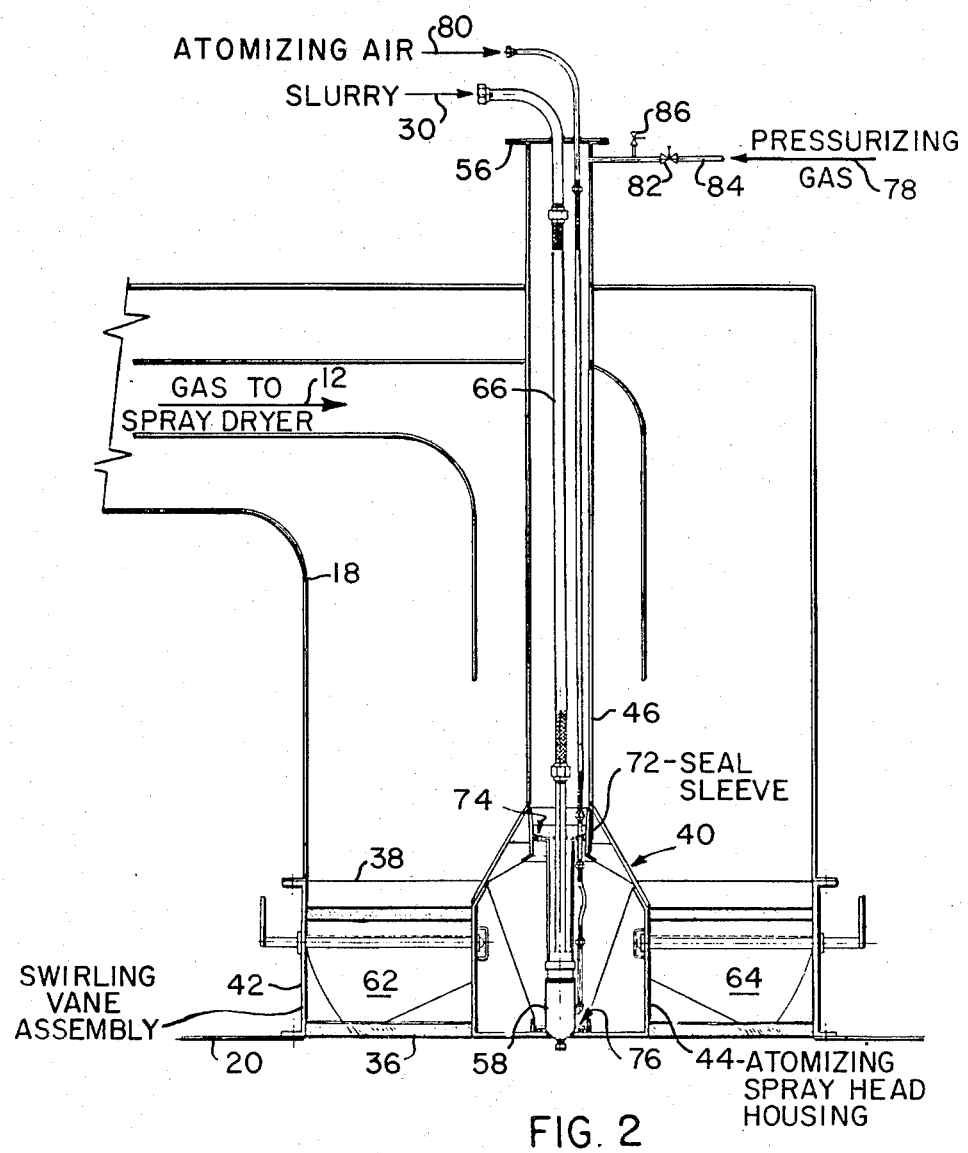
FIG. 2 is a side elevational, cross-sectional view of the spray nozzle assembly of the present invention.
Figure 3:
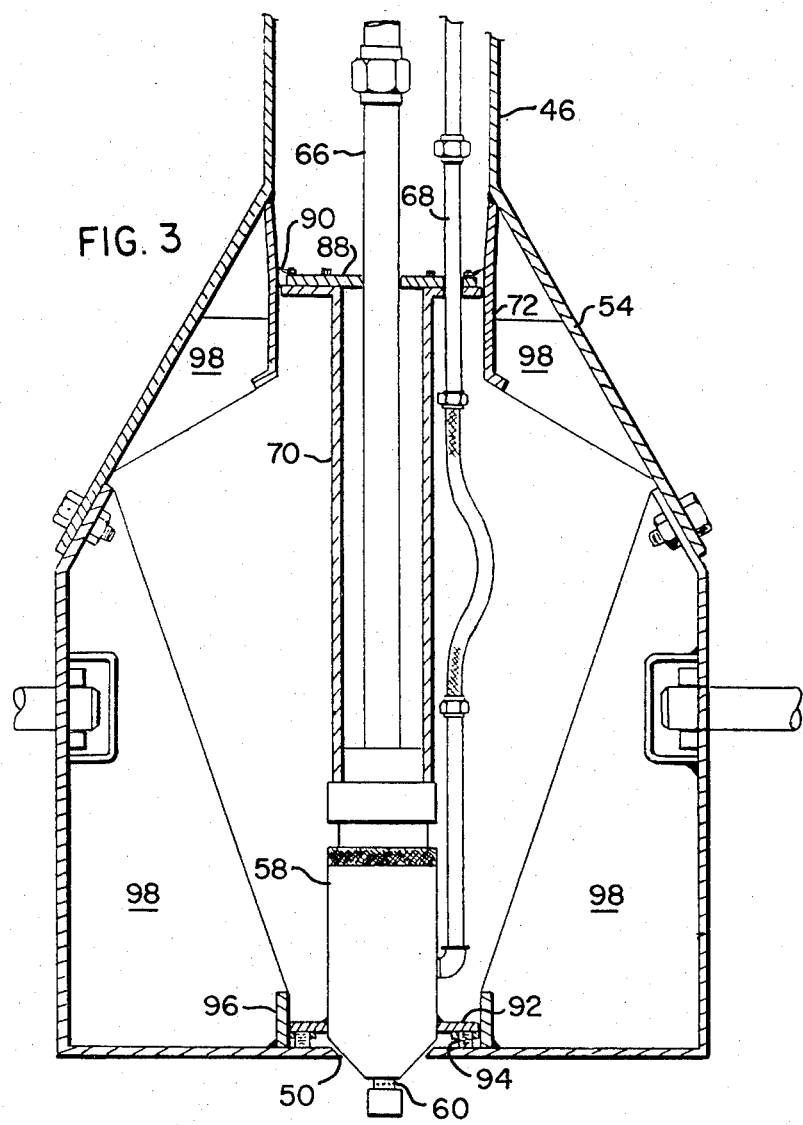
FIG. 3 is a more detailed close-up view of the lower central portion of the spray nozzle assembly of FIG. 2.

In order to obtain optimal sulfur oxide absorption efficiencies and to completely dry the resultant salts to a fine powder, it is extremely important that the reactant slurry be brought into intimate contact with the hot drying gas as a finely atomized, mist-like spray. In accordance with Applicant's invention, there is provided a spray nozzle assembly, as best seen in FIGS. 2 and 3, specifically designed to provide intimate contact between the hot gas and the slurry spray.

The body of the spray nozzle assembly 40 of the present invention is defined by an annular swirler vane assembly 42, an atomizing spray head housing 44, and an elongated guide tube 46. The annular swirler vane assembly 42 is disposed about the gas inlet 36 in the roof of the spray dryer housing 20 intermediate the outlet 38 of the gas supply duct 18 and the top of the spray dryer housing. Disposed coaxially within the center of the annular swirler vane assembly 42 is an atomizing spray head housing 44 having a floor 48 with a central opening 50 therein at its lower end and a conical, inwardly-flared flange 52 at its upper end. The elongated guide tube 46 has a conical, outwardly-flared flange 54 at its lower end adapted to mate with the conical, inwardly-flared flange 52 of the atomizing spray head housing 44.

The guide tube 46 extends upwardly from the spray head housing 44 through the gas supply duct 18 to terminate in a capped upper end 56 at a point external to the gas supply duct 18. An atomizing spray head 58, preferably a spray nozzle, is disposed at the central opening 50 in the floor 48 of the atomizing spray head housing 44 with spray tip means 60 extending through the central opening into the spray drying chamber 20 for introducing a slurry spray into the spray drying chamber.

Hot drying gas such as flue gas 12 from the furnace 10 is passed vertically downward through the outlet opening 38 into the spray drying chamber 20 through an annular flow passageway 62 between the outer wall of the annular swirler vane assembly 42 and the spray head housing 44. Disposed within the annular flow passageway 62 of the swirler vane assembly 42 are a plurality of swirler vanes 64 which impart a rotational motion to the drying gas as it passes therethrough into the spray dryer 20 thus producing a vortex flow of drying gas about the spray tip means 60 of the atomizing spray head 58. Slurry 30 is supplied to the atomizing spray head 58 through slurry supply line 66 which passes through the capped end 56 of the guide tube 46 disposed externally of the gas duct 18 and through the interior of the elongated guide tube 46 to connect with the atomizing spray head 58. When a spray nozzle is utilized as the atomizing spray head 58, atomizing air 80 is also supplied to the atomizing spray head 58 through an atomizing air supply line 68 which also penetrates through the capped end 56 of the guide tube 46 and thence through the interior of the guide tube 46 to connect with the atomizing spray head 58. The atomized slurry is then sprayed out of spray tip means 60 as a fine mist into the swirling, drying gas passing into the spray dryer 20 through the annular flow passageway 62 of the swirler vane assembly 42 of the spray nozzle assembly 40.

As mentioned previously, it is highly desirable that the atomizing spray head be readily removable from the spray drying chamber so that it may be maintained or replaced. According to the present invention, the spray head 58 is threaded into a support tube 70 and suspended therefrom so that its tip 60 passes through the central opening 50 in the floor 48 of the spray head assembly housing 44 into the spray dryer 20. The support tube 70 extends upwardly from the spray head 58 into a seal sleeve 72 mounted to and extending downward from the guide tube 46 at a point near where the lower end of the guide tube flares outwardly to form the conical flange 54. The seal sleeve 72 forms an extension of the tubular portion of the guide tube 46 downwardly into the interior space of the outwardly-flared flange 54 thereof. The support tube 70 extends upwardly from the atomizing spray tip 58 attached thereto into the seal sleeve 72 and is slidably translatable within the seal sleeve 72 and the guide tube 46. This permits the support tube 70 and the atomizing spray head 58 attached thereto to be withdrawn upwardly through the seal sleeve 72 into and thence through the interior of the guide tube 46 and out the capped end 56 thereof to a location exterior of the gas supply duct 18.

First seal means 74 are provided at the upper end of the support tube 70 to seal the circumferential gap between the cylindrical seal sleeve 72 and the outer circumferential edge of the support tube 70 which is slidable within the seal sleeve 72 thereby providing a gas tight seal between the interior of the guide tube 46 and the interior of the atomizing spray head housing 44.

Additionally, second seal means 76 disposed about the lower end of the spray head 58 provide a gas tight seal between the interior of the spray head housing 44 and the interior of the spray dryer 20 thus preventing hot flue gas from entering into and contaminating the inside of the spray head assembly 44. To effectuate the gas tight seals at first seal means 74 and second seal means 76, a pressurizing gas 78 is controllably supplied by control valve 82 through supply line 84 into the interior of the guide tube 46 at a location intermediate the capped end 56 thereof and the first seal means 74 disposed between the seal sleeve 72 and the support tube 70. As the interior of the guide tube 46 is pressurized to a level greater than the pressure of the gas in the spray dryer 20, a pressure force is exerted against the first seal means 74 thereby effectuating a gas tight seal between the seal sleeve 72 and the support tube 70. Additionally, the pressure force drives support tube 70 and the spray head 58 attached thereto downwardly so as to force the second seal means 76 against the floor of the atomizing spray head housing 44 thereby effecting a gas tight seal between the interior thereof and the interior of the spray dryer 20.

In the preferred embodiment, as best seen in FIG. 3, the first seal means 74 comprises an upper seal plate 88 mounted to the top of the support tube 70 and a flexible ring seal 90 mounted about the circumference of the upper seal plate 88 and extending outwardly therefrom to contact the seal sleeve 72 thereby providing a gas tight seal between the seal sleeve 72 and the support tube 70 whenever the interior of the guide tube 46 is pressurized. Two holes are drilled through the upper seal plate 88 to accommodate the slurry supply line 66 in the atomizing air supply line 68. Any gap between the seal plate 88 and the supply lines 66 and 68 passing through the holes therein is sealed, preferably by welding the supply line to the plate, in order to prevent any leakage of pressurizing gas therebetween.

In the preferred embodiment, the second seal means 76 comprises an annular lower seal plate 92 mounted about the lower end of the atomizing spray head 58 and ring seal 94 disposed between the lower seal plate 92 and the floor 48 of the atomizing spray head housing 44 for providing a gas tight seal therebetween. Preferably, the ring seal 94 is cemented to the lower surface of the lower seal plate 92 so that when the spray nozzle head 58 is withdrawn for maintenance, the ring seal 94 is also withdrawn for inspection and replacement.

When the pressure established within the interior of the guide tube 46 by the pressurizing gas is greater than the pressure of the flue gas within the spray dryer 20, there is a net force acting against the flexible ring seal 90 thereby effecting the gas tight seal between the seal sleeve 72 and the support tube 70, as well as a force acting downwardly against the upper seal plate 88 which is transmitted through the support tube 70 and the spray head 58 attached thereto to drive the lower seal plate 92 mounted to the spray head 58 downwardly against ring seal 94 disposed between the lower seal plate 92 and the floor 48 of the spray head assembly 44 thereby effecting the gas tight seal between the lower seal plate 92 and the floor 48 of the atomizing spray head housing 44 to prevent leakage of the flue gas into the interior of the atomizing spray head housing 44. The pressure force exerted against the upper seal plate 88 also serves to hold the spray head assembly in place during operation, i.e., this pressure force tends to counteract any upward thrust on the spray head assembly generated by the slurry spray which is generally directed outwardly and downwardly from the spray head tip.

In a further refinement of the preferred embodiment, a cylindrical retainer ring 96 is disposed coaxially about the annular lower seal plate 92 and mounted to the floor 48 of the spray head assembly housing 44. The retainer ring 96 assists in proper positioning of the atomizing spray head 58 within the nozzle head assembly housing 44. Additionally, upper and lower gussets 98 are provided within the spray head assembly housing 44 and the conical flange 54 of the guide tube 46, respectively, in order to provide structural rigidity to the spray nozzle assembly.

To remove the spray head 58 for inspection and maintenance the following procedure is contemplated. First, gas flow to the particular spray head assembly in question is shut off by closing a damper located upstream thereof in the gas supply duct associated with the particular spray head assembly in question. Then pressure is relieved from the interior of guide tube 46 by venting the pressurizing gas therein to the atmosphere through relief valve 86 and the capped end 56 of guide tube 46 is uncapped.

The entire spray head assembly, i.e., support tube 70, first seal means 74 disposed at the upper end of support tube 70, spray head 58, and second seal means 76 disposed at the lower end of spray head 58, may now be slid up through guide tube 56 and removed. Preferably, the slurry and atomizing air supply lines, 66 and 68, are of flexible tubing so that minimum head room is required exterior of the gas supply duct. If a spare assembly is available, it can now be lowered into position and operation of the spray dryer continued while the removed spray head assembly is inspected and repaired in the maintenance shop.

To replace the spray head assembly, it is merely slid downwardly through the guide tube 46 until the spray head reaches the floor 48 of the housing 44. As spray dryers are usually operated at a pressure slightly less than atmospheric, there will be a slight suction force which will pull the spray head assembly into proper position about the central opening 50 in the floor 48 of the housing 44. The end 56 of guide tube 46 is then capped and control valve 82 opened to supply pressurizing gas, preferably compressed air, into the interior of the guide tube 46 until the necessary pressure to seal the first and second seal means is established. Gas flow is then again supplied to the spray head assembly.

From the above, it can be seen that a nozzle spray head assembly has been provided for injecting a slurry or solution to be dried into a spray dryer which readily permits access to the spray head for maintenance and inspection by providing that the spray head be withdrawable from the spray head assembly without removal and dismantling of the spray head assembly from the spray dryer.

While a preferred embodiment of the present invention has been shown and described for purposes of illustration and complying with the best mode requirements of 35 USC 112, it is evident that certain aspects of the invention are not limited to the particular details illustrated in the drawing and discussed in the specification. Therefore, the invention described herein is not to be construed as limited to the specific embodiment of a spray dryer apparatus for sulfur oxide removal as described herein, but is intended to encompass all variations and applications that do not depart from the spirit and scope of the invention as described in the appended claims.

We claim:

1. In a spray dryer apparatus having a housing defining a spray drying chamber wherein a slurry is dried by contact with a hot drying gas, a drying gas supply duct having an outlet in flow communication with said drying chamber through a gas inlet opening in the roof of said housing, and a spray head assembly of the type having an annular swirler vane assembly disposed about the gas inlet in the roof of said spray dryer housing intermediate the outlet of the drying gas supply duct and the top of said spray dryer housing thereby defining an annular flow passageway through which the drying gas passes from the outlet of the drying gas supply duct into the spray drying chamber, an atomizing spray head housing disposed coaxially within the center of said annular swirler vane assembly, said atomizing spray head housing having a floor with a central opening therein and a flange at its upper end, and an atomizing spray head disposed at the central opening in the floor of said atomizing spray head housing and having tip means extending through the central opening for introducing the slurry to be dried into said drying chamber; an improved means for releasably supporting the spray head within said housing in sealed relationship therewith comprising:

a. an elongated guide tube having a conical outwardly-flared flange at its lower end adapted to mate with the flange of said atomizing spray head housing and extending upwardly through the drying gas supply duct to terminate in a capped upper end disposed externally of the drying gas supply duct;

b. an elongated seal sleeve mounted to and extending downward from said guide tube at the point near where the lower end of said guide tube flares outwardly, said seal sleeve forming an extension of the tubular portion of said guide tube into the interior space of the outwardly-flared flange thereof;

c. a support tube extending upwardly from said atomizing spray head into said seal sleeve, said support tube being slidably translatable within said seal sleeve and said guide tube so as to permit said support tube and the atomizing spray head attached thereto to be withdrawn upwardly through the guide tube to a location exterior of the drying gas supply duct;

d. means passing through said guide tube for supplying slurry to said spray head;

e. first seal means disposed between said support tube and said seal sleeve for providing a gas tight seal between the interior of said guide tube and the interior of said atomizing spray head housing; and f. second seal means disposed at the lower end of said spray head for providing a gas tight seal between the interior of said atomizing spray head housing and said spray drying chamber.

2. A spray head assembly as recited in claim 1 further comprising means passing through said guide tube for supplying atomizing air to said spray head.

3. A spray head assembly as recited in claims 1 or 2 wherein said first seal means comprises:

a. an upper seal plate mounted to the top of said support tube; and b. first ring seal means mounted about the circumference of said upper seal plate and extending outwardy therefrom to contact said seal sleeve thereby providing a gas tight seal between said seal sleeve and said support tube.

4. A spray head assembly as recited in claim 3 wherein said second seal means comprises:
   a. an annular lower seal plate disposed coaxially about and mounted to the lower end of said atomizing spray head; and
   b. second ring seal means mounted and disposed between said lower seal plate and the floor of said atomizing spray head housing for providing a gas tight seal therebetween.

5. A spray head assembly as recited in claim 1 further comprising:
   means for controlling and supplying a pressurized gas into the interior of said guide tube at a location intermediate the capped under end thereof and said upper seal plate so as to establish a pressure force against said first seal means thereby effecting the gas tight seal between said seal sleeve and said support tube and a pressure force against said upper seal plate whereby said lower seal plate is driven downwardly thereby effecting the gas tight seal between said lower seal plate and the floor of said atomizing spray head housing.

* * * * *